United States Patent [19]

Kumar et al.

[11] Patent Number: 5,528,486
[45] Date of Patent: Jun. 18, 1996

[54] FIRING PATTERN OUTPUT GENERATION FOR AC TRACTION INVERTER CONTROL

[75] Inventors: Ajith K. Kumar; Thomas D. Stitt, both of Erie, Pa.

[73] Assignee: General Electric Company, Erie, Pa.

[21] Appl. No.: 399,247

[22] Filed: Mar. 6, 1995

Related U.S. Application Data

[63] Continuation-in-part of Ser. No. 261,656, Jun. 17, 1994, Pat. No. 5,414,615, which is a continuation of Ser. No. 85,463, Jun. 30, 1993, which is a continuation-in-part of Ser. No. 618,787, Nov. 27, 1990, Pat. No. 5,168,439.

[51] Int. Cl.$^6$ .................................................. H02M 7/44
[52] U.S. Cl. ........................ 363/95; 363/41; 318/811; 364/480
[58] Field of Search ........................ 363/41, 95, 97; 318/811; 364/480–486; 323/241, 283

[56] References Cited

U.S. PATENT DOCUMENTS

| | | | |
|---|---|---|---|
| 4,047,083 | 9/1977 | Barr | 318/231 |
| 5,168,439 | 12/1992 | Kumar et al. | 363/95 |
| 5,414,615 | 5/1995 | Kumar et al. | 363/95 |

Primary Examiner—Peter S. Wong
Assistant Examiner—Adolf Berhane
Attorney, Agent, or Firm—Jill M. Breedlove; Marvin Snyder

[57] ABSTRACT

A method and apparatus for generating gating signals for each of a plurality of electric switching devices in electric power conversion circuit includes a microcomputer for computing timing data representative of a relative time for application of gating signals to each of the switching devices for generating a desired electric power output from the conversion circuit. The timing data is provided to a volatile memory which has a plurality of addressable memory locations in which each memory location address corresponds to a selected time increment. Timing signals are generated in an address format for the memory such that each of the timing signals addresses a unique memory location in the memory. The gating signals for the switching devices are stored in memory locations in the memory corresponding to the time with respect to a starting point at which it is desired to have the gating signals generated. As the timer-counter generates sequential timing signals, sequential locations in the memory are addressed and, if a gating signal is present in that location, a gating signal is output to the conversion circuit.

12 Claims, 2 Drawing Sheets

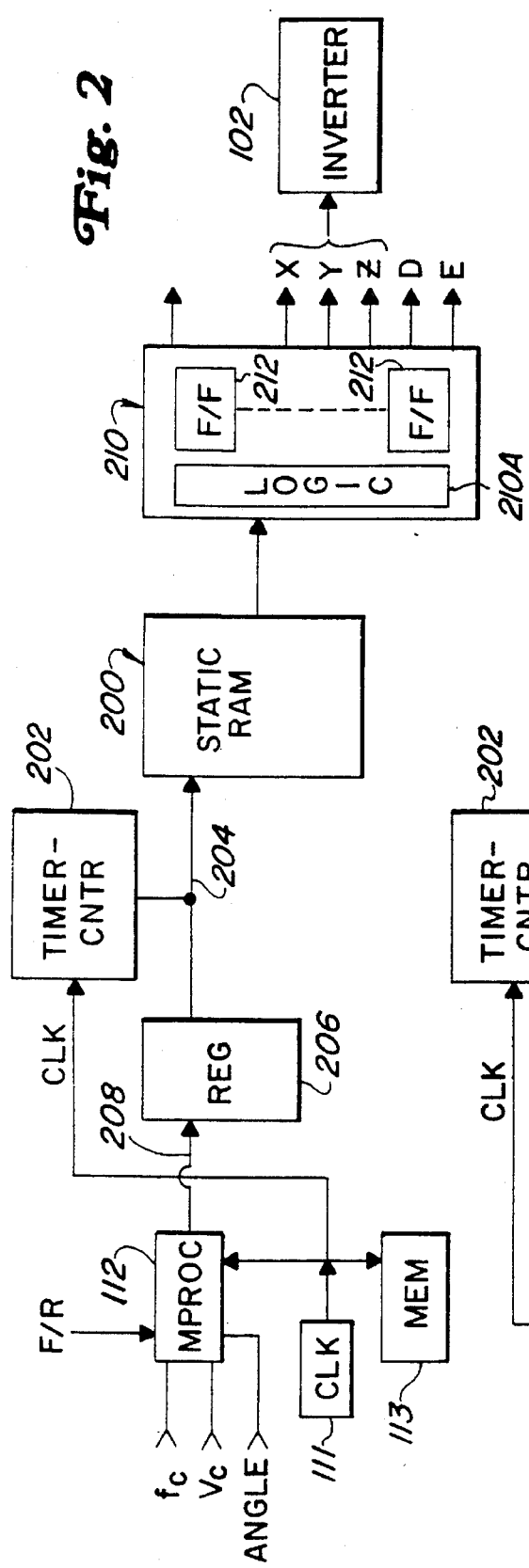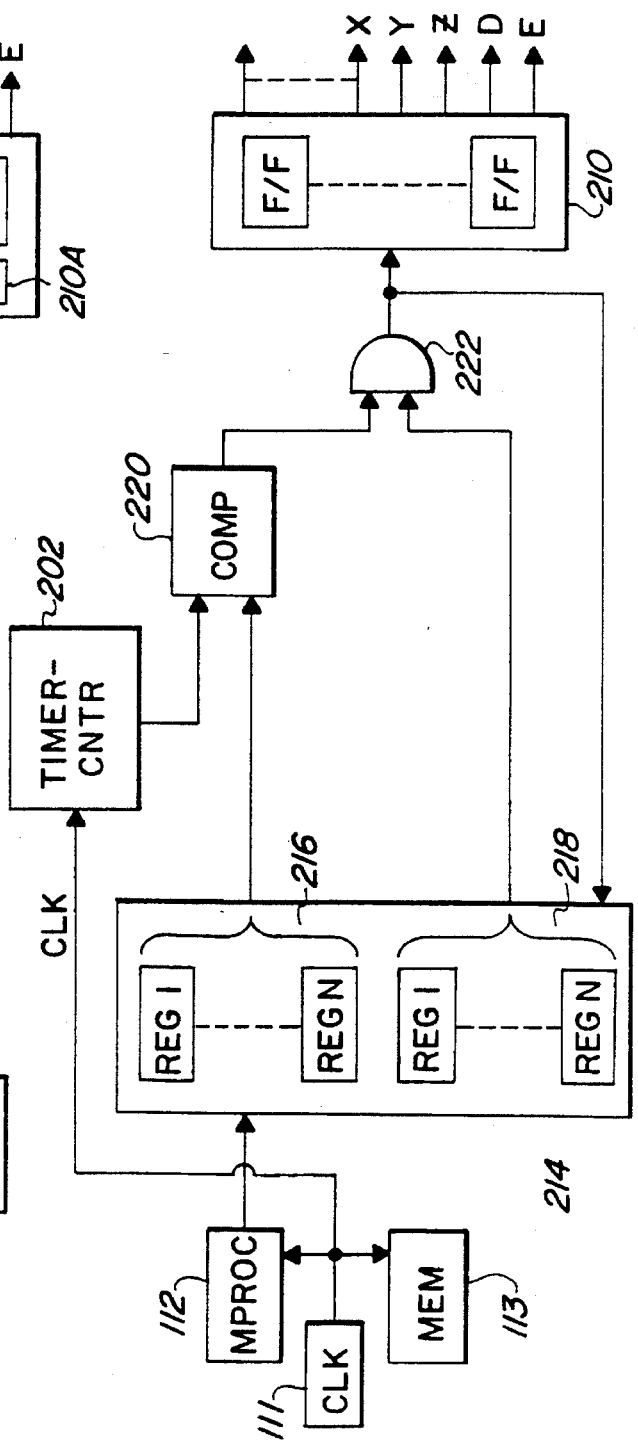

FIRING PATTERN OUTPUT GENERATION FOR AC TRACTION INVERTER CONTROL

BACKGROUND OF THE INVENTION

This application is a continuation-in-part of U.S. patent application No. 08/261,656, Jun. 17, 1994, now U.S. Pat. No. 5,414,615, which is a continuation of U.S. patent application Ser. No. 08/085,463 filed Jun. 30, 1993 which is a continuation-in-part of U.S. patent application Ser. No. 07/618,787 of Kumar et al., filed Nov. 27, 1990, now U.S. Pat. No. 5,168,439, both of which are herein expressly incorporated by reference.

This application relates generally to inverter circuits for converting dc voltage to ac voltage and, more particularly, to a control circuit for generating firing signals for an inverter circuit for converting dc voltage to three phase variable amplitude and frequency ac voltage. While the invention of the present application is generally applicable to such power conversion, it is particularly applicable to a controller for adjustable drive ac motors for electrically propelled rail vehicles.

Typically, in the conversion of dc voltage to ac voltage, an ac or sine wave reference signal is compared with a higher frequency wave to create a pulse width modulation (PWM) signal proportional to the reference signal. The resulting PWM signal is used to drive a power switching inverter, which converts dc voltage into ac voltage and is normally constructed of unidirectional conducting switching elements such as power transistors, thyristors, gate turn off (GTO) devices, IGBT's or the like. The PWM mode of operation must ultimately give way to a square wave mode of operation to obtain the maximum possible output voltage from any conversion arrangement. Unfortunately, a problem is encountered in the transition between triangle interception PWM and unmodulated square wave modes of operation.

A number of attempts have been made to solve this problem. One proposed solution is to provide a series of transitional PWM modes of operation wherein the timing waveform is synchronized to the reference signal, its frequency or slope is variously modified, and/or the amplitude of the reference signal is varied as necessary to reduce the number of "chops" or transitions of the signal which constructs the ac voltage without discontinuity in the amplitude of the fundamental output waveform.

Another proposed solution is disclosed in U.S. Pat. No. 4,047,083 wherein a control arrangement is made up of three modes of operation: the first mode is a triangle interception PWM operating mode which is used as long as an amplitude control signal does not exceed a predetermined reference value and the speed of a controlled motor does not exceed a predetermined reference speed; the second operating mode is a dual dc level set transition mode in which the lower level is varied as a function of the higher level so as to minimize selected harmonics of the ac voltage component; and the third operating mode is square wave mode. Transition from the second mode to the third mode is performed by transition means forming a part of the patented invention. For additional information regarding these prior art control arrangements, reference should be made to U.S. Pat. No. 4,047,083 which is expressly incorporated herein by reference.

While the control arrangements of the referenced U.S. '083 patent provides a substantial improvement over prior existing and proposed arrangements, there remains a need for an improved simplified control arrangement for generating firing signals for an inverter drive circuit for converting dc voltage to three phase variable amplitude and frequency ac voltage, which is inexpensive, versatile, and adaptable to the requirements of specific applications. Such improved arrangements not only advance the art, but also provide attractive alternatives thereto while improving the performance of systems incorporating them.

SUMMARY OF THE INVENTION

Among the several objects of the present invention may be noted the provision of an improved method and apparatus for generating multitudinous gating signals for electric power conversion circuits and the provision of an improved method and apparatus for generating multitudinous signals at preselected time intervals from a microprocessor without overburdening the processor with interrupt calls. In one form, the invention is illustrated as a control circuit for generating gating signals for each of a plurality of semiconductor switching devices in an electric power conversion circuit. The control circuit includes a microcomputer which generates timing data for determining a time for applying gating signals to each of the semiconductor switching devices in order to generate a desired power output from the power conversion circuit. The control circuit further includes a volatile memory means such as a random access memory (RAM) which has a plurality of addressable memory locations with each of the memory locations being sequentially addressable in which each memory location is one count incremented from a preceding memory location. A timer-counter is adapted for outputting a digitized time signal in a form suitable for sequentially addressing each of the memory locations in the volatile memory as the counter sequentially advances in time. The microcomputer is programmed to transfer gating signals indicating which of the selected ones of the switching devices is to be gated into and out of conduction and such gating signals are loaded into memory locations in the volatile memory in a special format. In particular, the gating signals are loaded into the volatile memory with respect to a selected starting point such that the microcomputer can determine from the starting point the time in which each following gating signal will be generated by addressing a particular location in the volatile memory. More particularly, if a first gating signal is loaded into a first location in the volatile memory, a next following gating signal can be stored in a succeeding memory location in the volatile memory that is removed from the first location by the exact time difference between generation of the first and next occurring gating signal. In this manner, the timing signals generated by the timer-counter will sequentially address each memory location and arrive at the data stored in the second memory location a predetermined time after having arrived at the first memory location containing the first gating signals. In this manner, the microcomputer can load a plurality of gating signals into the memory locations of the volatile memory in advance of the time at which the gating signals are to be applied to the switching devices in the power conversion circuit. Accordingly, by loading a plurality of signals, it is not necessary for the microcomputer to be interrupted each time that a gating signal is generated so that a next succeeding gating signal can be used by the microcomputer for application to the conversion circuit. Rather, the gating signals can be downloaded to the volatile memory in batches, thereby minimizing the number of interrupts required in order to generate gating signals.

As the gating signals are sequentially addressed in the volatile memory by the timing signals for the timer-counter, the gating signals are loaded onto a data bus and transferred to a programmable gate array circuit which interprets the binary coded gating signals and supplies a corresponding gate control command to the switching devices in the power conversion circuit. The number of gating signals or other signals which can be loaded into the volatile memory is limited only by the size of the memory itself and by the ability to precalculate the appropriate gating signals for the conversion circuit in order to produce the desired output. Where the output of the conversion circuit is commanded at a fixed value, the number of advanced gating signals that can be generated may be limited only by the size of the memory. The data stored in the memory can also be interrupt signals or signals for application to other functions that are to be generated at preselected times and are not limited to generation of gating signals for the semiconductor switching devices in the conversion circuit.

In another form, the system is implemented in essentially the same manner but the microcomputer computes the gating signals and the time for application of the gating signals and separates the two functions so that the time in which gating signals to be applied are stored in a first group of registers or memory locations and the gating signals designating which semiconductor devices or other devices are to be actuated are stored in a second group of registers or memory locations. In this form, the timing data in the first group of registers is sequentially compared with the timing signals from the timer-counter and when a match occurs, a corresponding set of data from the second group of registers is then transferred to the output circuit. In this form, the output circuit is essentially the same circuit used in the first embodiment and comprises a programmable gate array which can interpret the gating signals to apply appropriate ones of the signals to the selected switching devices in the power conversion circuit. The second embodiment provides the same function as the first embodiment in that it allows the microcomputer to be unloaded by allowing batch transfer of computed timing and gating signals to the volatile memory whereby selection of the gating signals is then handled by the secondary circuit of the timer-counter rather than being dependent on the microprocessor to generate the gating signals at appropriate times. Furthermore, the second embodiment also eliminates the number of interrupts that have to be generated in previous systems in which the microprocessor was interrupted each time that a gating signal was downloaded to the power conversion circuit.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 2 illustrates an inverter control circuit in accordance with one embodiment of the present invention; and FIG. 3 illustrates an inverter control circuit in accordance with another embodiment of the present invention.

DETAILED DESCRIPTION OF THE INVENTION

Figure 1:
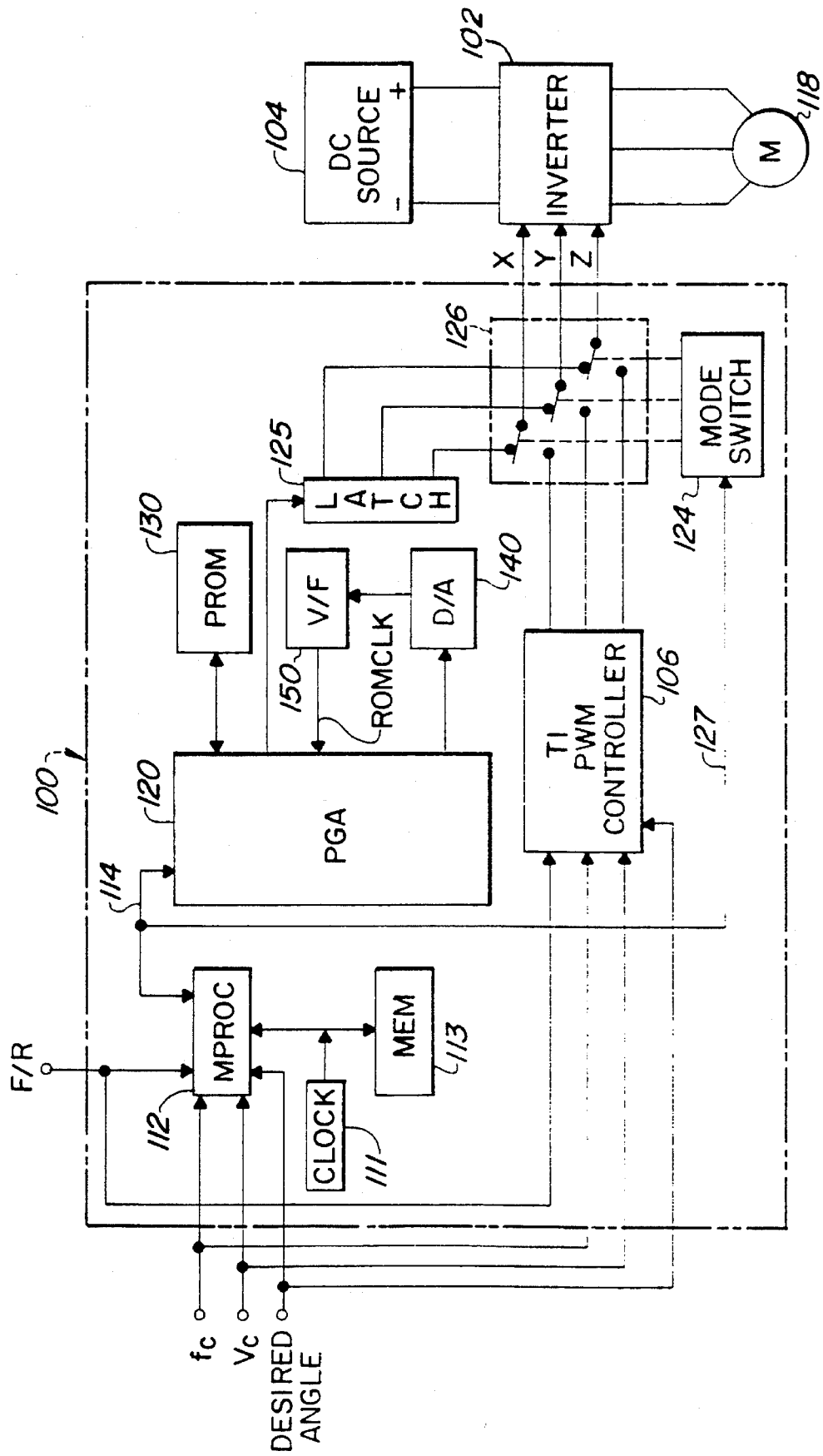
FIG. 1 is a block diagram of one embodiment of an inverter control circuit of the prior art.

In order to better understand the invention of the present application, the reader is first directed to FIG. 1 which shows a prior implementation of a control system for an inverter coupled to control power to an alternating current (AC) motor. For ease of description and understanding, the illustrated embodiment of FIG. 1 can be thought of as operating in the motor drive of previously referenced U.S. Pat. No. 4,047,083 and taking the place of all but the triangle interception (TI) PWM portion of the waveform generator of the referenced patent. The switch-over between triangle interception PWM control and digitized control is performed by a microprocessor. As illustrated in FIG. 1, an inverter control circuit 100 generates gating signals X, Y, Z for an inverter circuit 102 which converts DC voltage from a DC source 104 to three phase variable amplitude and frequency AC voltage to drive an AC motor 118.

FIG. 1 shows a microcomputer or processor (MPROC) 112, including a memory 113, which stores a software program executed by processor 112, and including a clock 111. FIG. 1 also includes a triangle (TI) pulse width modulator (PWM) controller 106, a programmable gate array (PGA) 120, a mode switch 124, a latch 125, switches 126, a PROM 130, a D/A converter 140, and a V/F (voltage to frequency) converter 150.

In FIG. 1, a frequency command fc, a voltage amplitude command Vc, and a "desired angle" command are inputs to processor 112 and controller 106. These commands indicate a desired frequency, voltage, and angle respectively, at which motor 118 should be driven. The signals fc, Vc, and desired angle may be generated, for example, from an external source, or may be generated by processor 112 using a method not described herein. Processor 112 also receives a F/R (forward/reverse) signal indicating a desired direction of rotation of the motor 118. Each of the signals fc, Vc, and F/R is also provided to TI PWM controller 106. Processor 112 controls mode switch 124 to set switches 126 to select output from either TI PWM controller 106 or latch 125, which contains the output of PGA 120, as described below.

Processor 112 initially sets a desired voltage amplitude and desired instantaneous angle into PGA 120 via line 114. Counters in PGA 120 are incremented (or decremented) at a regular rate according to an output signal ROMCLK of V/F converter 150. The signal ROMCLK is generated in accordance with a frequency input to D/A 140. This frequency also may be set by processor 112 as described below.

PGA 120 uses the signal ROMCLK to increment or decrement counters in PGA 120 that are used to address PROM 130. PGA 120 uses the output of PROM 130 to generate gating signals X, Y, and Z for inverter 102, which are sent through latch 125. Gating signals are stored in PROM 130 in the form of firing pattern signals defining on/off states of the switching devices in inverter circuit 102.

PROM 130 stores a plurality of pattern tables, e.g., 50 tables. Each pattern table in PROM 130 includes 1024 entries. Each pattern table is used to generate output at a different percentage of a maximum voltage output of inverter 102. In the described embodiment, the tables represent successive 2% increments. For example, a first table is used to generate output at 2% of a maximum voltage output, a tenth table is used to generate a output at 20% of the maximum voltage, and a fiftieth table is used to generate output at 100% of a maximum voltage.

The format of each entry of the pattern tables provides that the three lower-most bits (bits 0–2) store firing values A1, B1, and C1 for the sector of 0–30⁻ and the next three low bits (bits 3–5) store firing values A2, B2, and C2 for the sector of 30–60⁻. Thus, each of the 1024 entries in a pattern table stores firing data for two different sectors. Because the sine wave characteristics for a three phase system have sine waves which are out of phase with each other by 120⁻, firing data for only two sectors (0–30⁻ and 30–60⁻) may be used to generate 360⁻ of firing data. Each entry corresponds to an angle on a sine wave and designates a "firing angle" for a gating signal to be applied to a respective one of the switching devices in the inverter. The firing values or angles in the pattern tables are generated offline in a manner known to persons of ordinary skill in the art. The table values are generally selected to optimize the number of switching cycles and the harmonic output voltage generated.

The details of operation of the above described system are set forth in application Ser. No. (20TR1770), the disclosure of which is hereby incorporated by reference. In essence, the processor 112 is interrupt driven and can be interrupted at intervals as short as one microsecond to execute an instruction set stored in memory to select one of the tables of firing angles and to thereby control the amplitude, phase and frequency of the fundamental component of the motor voltage applied to motor 118. The process requires multiple timers to produce the corresponding time delays and requires interrupts after each event. The processor thus requires more resources devoted to accessing the tables and initiating or responding to counters. The processor is limited to the number of events that can be programmed ahead by the number of counters, i.e., for six counters, the processor can schedule six events. After each event, the processor is interrupted in order to schedule a next event.

The present invention overcomes the limitations in the prior art system and increases the number of events that can be programmed ahead to several thousand while using only one timer-counter. Furthermore, the invention provides a method which does not require interruption of the processor after each switching event occurs thereby decreasing processor requirements. In an illustrative form and referring to FIG. 2, the present invention includes a volatile memory such as a static random access memory (SRAM) 200 whose address is incremented at a fixed clock rate. More particularly, static RAM 200 may be an N×32K memory where N is the number of bits at each memory address/location, e.g., 16 bits. The address for each location is a sequential increment from an immediately preceding address. For example, the first address may be 0000 (in Hex), the second is 0001, the third is 0002, etc. Each address is sequentially generated by a timer-counter 202 which outputs a 15 bit binary count on address bus 204 that becomes the address for each memory location in RAM 200.

Timer-counter 202 is a commercially available counter such as a type RCA CB54ACT161 synchronous four bit binary counter. A high frequency clock signal (e.g., 16 Mhz) is applied to the timer-counter which then functions to divide the clock down to produce an output signal (the aforementioned binary count) every 0.5 microseconds. Thus, every one-half microsecond a new location in SRAM 200 is addressed by the incremented value of the count output from timer-counter 202. Timer-counter 202 is matched to SRAM 200 so that each memory location corresponds to an output count. More particularly, if SRAM 200 has 32K memory locations, counter 202 is designed to count from 0 to 32K and then reset to 0. As will be apparent, if the timer-counter 202 is initially synchronized to the processor 112, the processor will know at any time which address location in RAM 200 is currently being addressed by timer-counter 202.

The address bus 204 for static RAM 200 is also coupled to receive address data from a temporary storage register 206, which register is connected via bus 208 to microcomputer 112. Register 206 is adapted to temporarily store address and control data for a time period sufficient to enable transfer to RAM 200 and functions to synchronize data transfer between microcomputer 112 and RAM 200. More particularly, microcomputer 112 computes, as described above with respect to FIG. 1, a time at which each switching device in inverter 102 is to be switched between on and off states in order to generate a selected PWM waveform. This data is then transferred from the microcomputer to register 206 where it may be stored for up to 0.5 microseconds, i.e., one time increment of counter 202. Within one time increment, register 206 will gain access to RAM 200 and can transfer its data into RAM 200.

It is not required that microcomputer 112 be synchronized to or have prior knowledge of which address location in RAM 200 is currently being addressed by counter 202. For the illustrative 32K×16K RAM, counter 202 will sequentially step through every memory address location in 16 milliseconds at a rate of one location each 0.5 microsecond. The computed firing data for inverter 102 establishes an arbitrary initiation time with all subsequent firing or gating times being referenced to the initial arbitrary time. This initial time may occur anytime between 0 and 16K microseconds with reference to RAM 200, i.e., the address location being addressed by counter 202 when the initial gating signal for inverter 102 is generated can be any location between 0 and 32K. If, for example, the system is operating such that address location 3FFF in RAM 200 is currently addressed by counter 202, the initial firing or gating signal can be loaded into RAM 200 at any address location and will be supplied as an output within no more than 16 milliseconds. The gating signal from RAM 200 is coupled via bus 208 to an output module 210 which comprises a plurality of flip-flops 212 which are selectively set and/or reset by the gating signal so as to provide appropriate signals to inverter 102. In practice, module 200 and register 206 are integrated into a programmable gate array circuit of a type well known in the art such as that illustrated at 120 in FIG. 1. The gate array circuit includes logic block 210A which is configured to interpret the gating signals from SRAM 200 and actuate the appropriate flip-flops 212 to generate commands to inverter 102. The flip-flops 212 are so arranged that, for a three-phase inverter having two switching devices in each of three series circuits, one switching device in each circuit is always gated off when the other switching device is gated on.

The module 210 can provide numerous output commands. For purposes of illustration, the module 210 provides the X, Y, Z signals of FIG. 1 but can also supply other signals such as the illustrated D and E signals used in controlling other switching devices such as might be used to regulate the DC voltage supplied to inverter 102 and for generating interrupts for the processor and synchronizing signals between multiple inverters. A buffer circuit (not shown) may be connected between module 210 and inverter 102 to properly condition the signals from module 210 into an appropriate level for application as driver signals to the switching devices of inverter 102. The difference between PGA 120 and the output module 210 is primarily in the programming since each element receives the appropriate binary coded firing signals (from PROM 130 and SRAM 200) and interprets those firing signals to produce corresponding gating signals for application to inverter 102.

Considering again the operation of RAM 200, once the initial, arbitrary gating signal has been loaded via data bus 204 into an initial address location in SRAM 200 selected by microcomputer 112, subsequent gating signals are then loaded into other address locations timed from that initial location. Again assuming that at the time of loading of the initial gating signal, the memory location being addressed is 3FFF, the initial gating signal can be loaded into any memory location. For example, if the initial gating signal is loaded into memory location 0001 (HEX), the data in that location, having the format as described in the aforementioned patent application Ser. No. (20TR-1770), will be output to module 210 in about 8 milliseconds. Subsequent gating signals are timed from the initial gating signal, i.e., if another event is to be scheduled for 2 milliseconds after the initial gating signal, data for the subsequent event is stored in decimal memory location 2001 (7 dl HEX), which memory location will be addressed 2 ms after location 0001 by counter 202. Thus, each location in RAM 200 is now determinable by microcomputer 112 with reference to the initial event since each location is addressed on a sequential time basis. The number of events that can be planned ahead is limited only by the size of RAM 200. Assuming that events are scheduled at 10 microsecond intervals, up to 1600 events could be stored in RAM 200 at a given time.

While each address location is sequentially addressed by counter 202, it is not desired to output the data in each location each time the location is addressed. For example, assuming that location 0001 contains data to direct gating of selected switching devices in inverter 102 and that location 0002 contains all zeros, the imposition of the zeros onto bus 208 would change the gating data. Accordingly, microcomputer 112 uses a set flag bit, for example, bit 15 of each address, to set RAM 200 such that only data from a memory location having bit 15 set to a Logic 1 will be written onto bus 208.

Briefly recapitulating the operation of the inventive system of FIG. 2, the microcomputer 112 computes the firing or gating time of each of the switching devices in inverter 102 (and other events) and outputs data specifying which devices are to be switched as a data word. The switching data may be computed in various ways including the method described in the aforementioned U.S. Pat. No. 5,168,439 in which the firing data is stored in a PROM. The time at which each such device is to be switched is calculated with respect to an initial starting time with the initial event being stored in a selected memory location in RAM 200. The switching data is transferred to RAM 200 through a temporary storage register 206 which synchronizes data transfer with addressing of memory locations and data writing by counter 202. Once the microcomputer 112 has selected an initial memory location for writing of the initial gating data signal, each subsequent data event written to RAM 200 is timed from the initial event. The counter 202 sequential addresses each memory location in RAM 200 so that data stored in any location is written out onto bus 208. The microcomputer 112 controls writing of data onto bus 208 by setting an address bit when data is loaded/written to a memory location. As each location is addressed by counter 202, any data at that location is written onto bus 208 and causes output nodule 210 to generate corresponding gating signals for inverter 102.

The present invention provides significant advantages by allowing the microcomputer 112 to schedule a number of events in advance and eliminates the need for the microcomputer to be interrupted each time that an event occurs. The system also reduces the number of timers required and, since it reduces the microcomputer interrupts, can be used to control the inverter over its entire range of operation, thus eliminating the need for a triangle intercept circuit such as circuit 106 of FIG. 1.

FIG. 3 illustrates an alternate implementation of the invention of FIG. 2 in which the temporary register 206 is replaced by a register 214 having an address portion 216 and a control data portion 218. The register 214 is in essence a volatile memory since it operates to provide temporary storage for addresses and data and can be repeatedly overwritten. In practice, a conventional RAM module may be used for register 214. RAM 200 is not used in this embodiment, Microcomputer 112 operates in the same manner as before but now loads addresses in the same time format into sequential locations in register portion 216 and loads control data into corresponding locations in register portion 218. The counter output from timer-counter 202 is compared in comparator 220 to the address location in the first register location of register portion 216. When a match is detected, comparator 220 provides a gating signal to a binary AND gate 222 which couples control data from the corresponding location in register portion 218 to output module 210. A match signal from comparator 220 to register 214 causes the register to step to the next address and data locations waiting for the next time-counter match to occur.

The embodiment of FIG. 3 also achieves the object of unloading microcomputer 112, allowing the microcomputer to load data to register 214 when convenient rather than having to respond after each switching event occurs. This embodiment is more limited than that of FIG. 2 since the number of register locations is typically less than would be available at the same size and cost as RAM. For example, in one embodiment, eight address and eight data locations were used which is significantly less than the 32K locations which are available in the embodiment of FIG. 1. However, with some exceptions, switching events for inverters are generally timed in milliseconds rather than microseconds so that control of eight events by register 214 is a practical implementation. One such exception occurs at start-up when initial gating signals may be separated only by microseconds. Nonetheless, where many devices are being controlled, the capability for setting the timing of thousands of events in advance may be significant.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A control circuit for generating gating signals for each of a plurality of semiconductor switching devices in an electric power conversion circuit, comprising:

a microcomputer operable to compute timing delta for application of gating signals so as to generate a desired power output of the conversion circuit;

a volatile memory having a plurality of addressable memory locations, said memory locations having sequential addresses;

a timer-counter adapted for outputting digitized time signals at each of a plurality of time increments, each of the time signals comprising an address for a respective one of the memory locations in said memory whereby each of the memory locations is sequentially addressed by a corresponding one of the time signals as said timer-counter outputs sequential time signals;

said microcomputer transferring said gating signals to memory locations in said memory corresponding to said computed timing data whereby said gating signals are output from said memory in response to said corresponding memory locations being addressed by said time signal; and output means coupled to said memory and responsive to said gating signals for supplying gating signals to the semiconductor switching devices.

2. The control circuit of claim 1 wherein said gating signals comprise signals for selectively gating the switching devices into and out of conduction for implementing pulse width modulated power from the conversion circuit.

3. The control circuit of claim 2 and including an alternating current electric motor coupled to be driven by the power from the conversion circuit.

4. The control circuit of claim 1 wherein said output means comprises a plurality of flip-flops each connected to be set and reset by said gating signals.

5. The control circuit of claim 3 .wherein said conversion circuit comprises a direct current to three phase alternating current inverter.

6. The control circuit of claim 1 wherein said volatile memory comprises a first set of address memory locations and a second set of data memory locations, each address memory location being operatively associated with one of said data memory locations, said microcomputer loading an address in each address memory location corresponding to a digitized implementation time for gating signals loaded into corresponding ones of said data memory locations, and means for comparing the addresses in said address memory locations to said digitized time signals from said timer-counter and for transferring gating signals from corresponding ones of said data memory locations in response to matching of an address with a timer-counter signal.

7. The control circuit of claim 6 wherein said comparing means comprises means for comparing said addresses to said digitized time signal and for enabling transfer of data from said data memory locations when said timer signal corresponds to each of said addresses.

8. A method of generating gating signals for each of a plurality of electric switching devices in an electric power conversion circuit comprising the steps of:

computing timing data representative of a relative time for application of gating signals to each of the switching devices for generating a desired electric power output from the conversion circuit;

providing a volatile memory having a plurality of addressable memory locations wherein each memory location address corresponds to a selected time increment;

generating a sequence of timing signals having a memory address format such that each of the timing signals addresses a unique memory location in the volatile memory; and storing gating signals for the electric switching devices in memory locations in the volatile memory corresponding to the computed timing data whereby the gating signals are accessed in the memory at the computed relative time by the sequential addressing of the memory locations by the timing signals.

9. The method of claim 8 and including the step of identifying each memory location not containing a gating signal and inhibiting downloading of data from such non-gating signal containing locations to the conversion circuit.

10. A method of generating gating signals for each of a plurality of electric switching devices in an electric power conversion circuit comprising the steps of:

computing timing data representative of a relative time for application of gating signals to each of the switching devices for generating a desired electric power output from the conversion circuit;

providing a volatile memory having a plurality of addressable memory locations and operatively associating a first group of the memory locations with a second group of the memory locations on a one-to-one basis;

generating a sequence of timing signals having a memory address format such that each of the timing signals addresses a unique memory location in the volatile memory;

storing timing data for application of the gating signals to the electric switching devices in sequentially addressable memory locations in the first group of memory locations in the volatile memory and storing gating signals corresponding to the timing data in the second group of memory locations;

comparing the timing data stored in a first memory location in the first group of memory locations to the timing signals until one of the timing signals matches the stored timing data and thereupon generating a match signal to effect a transfer of the corresponding gating signals to the power conversion circuit; and repeating the step of comparing for each memory location of the first group until a last location is accessed and thereupon returning to the first memory location and continuing.

11. The method of generating gating signals as recited in claim 9 and including the further step of coupling the match signal to the volatile memory for causing the volatile memory to step from a present memory location to a next addressable memory location.

12. The method of claim 10 wherein the volatile memory comprises a plurality of registers.

* * * * *